United States Patent [19]

Masui

[11] Patent Number: 5,373,371
[45] Date of Patent: Dec. 13, 1994

[54] IMAGE PROCESSING APPARATUS

[75] Inventor: Takanori Masui, Kanagawa, Japan

[73] Assignee: Fuji Xerox Co., Ltd., Tokyo, Japan

[21] Appl. No.: 25,616

[22] Filed: Mar. 3, 1993

[30] Foreign Application Priority Data

Mar. 4, 1992 [JP] Japan .................. 4-047033

[51] Int. Cl.$^5$ .............................................. H04N 1/40
[52] U.S. Cl. ................................... 358/444; 358/488; 358/471; 358/474
[58] Field of Search ............... 358/444, 488, 448, 466, 358/471, 474; 382/46, 44; 348/134

[56] References Cited

U.S. PATENT DOCUMENTS

| | | | |
|---|---|---|---|
| 4,672,680 | 6/1987 | Middleton | 382/44 |
| 4,686,577 | 8/1987 | Arimoto | 358/488 |
| 4,802,229 | 1/1989 | Yamada | 382/46 |
| 5,027,227 | 6/1991 | Kita | 358/488 |
| 5,191,438 | 3/1993 | Katsurada et al. | 358/488 |

FOREIGN PATENT DOCUMENTS

| | | |
|---|---|---|
| 2-56081 | 2/1990 | Japan . |
| 2-130595 | 5/1990 | Japan . |
| 2-226372 | 9/1990 | Japan . |

Primary Examiner—Edward L. Coles, Sr.
Assistant Examiner—Fan Lee
Attorney, Agent, or Firm—Finnegan, Henderson, Farabow, Garrett & Dunner

[57] ABSTRACT

An image processing apparatus that reads the image on a document by raster scanning and which rotates it at the same time. The apparatus includes a comparing unit for comparing image data in a plurality of scan lines for one scanning direction in an original image including a region to be moved, a calculating unit for calculating deviation from reference lines of the region to be moved on the basis of a result of comparison by the comparing unit, and a moving unit for moving individual pixels in each scan line on the basis of a result of calculation by the calculating unit.

7 Claims, 12 Drawing Sheets

FIG. 5

| FAST SCANNING COORDINATE | PRECEDING LINE DOCUMENT START POINT PSX | PRECEDING LINE DOCUMENT END POINT PEX | CURRENT LINE DOCUMENT START POINT SX | CURRENT LINE DOCUMENT END POINT EX | SX-PSX | EX-PEX | DEVIATION SV | CORRECTED DOCUMENT START POINT CSX | CORRECTED DOCUMENT END POINT CEX |
|---|---|---|---|---|---|---|---|---|---|
| SCAN LINE 1 | — | — | 19 | 20 | — | — | — | — | — |
| SCAN LINE 2 | 19 | 20 | 15 | 20 | -4 | 0 | 0 | 15 | 20 |
| SCAN LINE 3 | 15 | 20 | 11 | 20 | -4 | 0 | 0 | 11 | 20 |
| SCAN LINE 4 | 11 | 20 | 6 | 20 | -5 | 0 | 0 | 6 | 20 |
| SCAN LINE 5 | 6 | 20 | 3 | 21 | -3 | 1 | 1 | 2 | 20 |
| SCAN LINE 6 | 2 | 20 | 3 | 21 | 1 | 1 | 1 | 2 | 20 |
| SCAN LINE 7 | 2 | 20 | 3 | 21 | 1 | 1 | 1 | 2 | 20 |
| SCAN LINE 8 | 2 | 20 | 4 | 22 | 2 | 2 | 2 | 2 | 20 |
| SCAN LINE 9 | 2 | 20 | 4 | 22 | 2 | 2 | 2 | 2 | 20 |
| SCAN LINE 10 | 2 | 20 | ... | ... | ... | ... | ... | ... | ... |
| ... | 2 | 20 | | | | | | | |

FIG. 6

| FAST SCANNING COORDINATE (ADDRESS) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| INITIAL STATE | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| SCAN LINE 1 | 0 | 0 | 0 | 0 | 0 | 0 | 0 | 0 | 0 | 0 | 0 | 0 | 0 | 0 | 0 | 0 | 0 | 0 | 1 | 1 | 0 | 0 | 0 |
| SCAN LINE 2 | 0 | 0 | 0 | 0 | 0 | 0 | 0 | 0 | 0 | 0 | 0 | 0 | 0 | 0 | 1 | 1 | 1 | 1 | 2 | 2 | 0 | 0 | 0 |
| SCAN LINE 3 | 0 | 0 | 0 | 0 | 0 | 0 | 0 | 0 | 0 | 0 | 0 | 0 | 0 | 1 | 2 | 2 | 2 | 2 | 3 | 3 | 0 | 0 | 0 |
| SCAN LINE 4 | 0 | 0 | 0 | 0 | 0 | 0 | 0 | 0 | 0 | 0 | 1 | 1 | 1 | 2 | 3 | 3 | 3 | 3 | 4 | 4 | 0 | 0 | 0 |
| SCAN LINE 5 | 0 | 1 | 1 | 1 | 1 | 1 | 1 | 1 | 1 | 1 | 2 | 2 | 2 | 3 | 4 | 4 | 4 | 4 | 5 | 5 | 0 | 0 | 0 |
| SCAN LINE 6 | 0 | 2 | 2 | 2 | 2 | 2 | 2 | 2 | 2 | 2 | 3 | 3 | 3 | 4 | 5 | 5 | 5 | 5 | 6 | 6 | 0 | 0 | 0 |
| SCAN LINE 7 | 0 | 3 | 3 | 3 | 3 | 3 | 3 | 3 | 3 | 3 | 4 | 4 | 4 | 5 | 6 | 6 | 6 | 6 | 7 | 7 | 0 | 0 | 0 |
| SCAN LINE 8 | 0 | 4 | 4 | 4 | 4 | 4 | 3 | 4 | 4 | 4 | 5 | 5 | 5 | 6 | 7 | 7 | 7 | 7 | 8 | 8 | 0 | 0 | 0 |
| SCAN LINE 9 | 0 | 5 | 5 | 5 | 5 | 5 | 5 | 5 | 5 | 5 | 6 | 6 | 6 | 7 | 8 | 8 | 8 | 8 | 9 | 9 | 0 | 0 | 0 |
| SCAN LINE 10 | 0 | 6 | 6 | 6 | 6 | 6 | 6 | 6 | 6 | 6 | 7 | 7 | 7 | 8 | 9 | 9 | 9 | 9 | 10 | 10 | 0 | 0 | 0 |
| ... | | | | | | | | | | | | | | | | | | | | | | | |

FIG. 10

```
procedure_104(reg1, reg2, SX, EX, LC)
int    *reg1;      /* Pointer of Register#1-103a PSX */
int    *reg2;      /* Pointer of Register#2-103b PEX */
int    SX;         /* Current Start position of document part */
int    EX;         /* Current End position of document part */
int    LC;         /* Line Count Parameter LC */
{
    int SV;     /* Horizontal Shift Value */
    int CSX;    /* Corrected Start position of document part */
    int CEX;    /* Corrected End position of document part */
    if(LC == 1)  {
       *reg1=SX;
       *reg2=EX;
       SV=0;
    }
    else {
      SV=(abs(SX-*reg1)>abs(EX-*reg2))?(EX-*reg2):(SX-*reg1);
      CSX=SX-SV;
      CEX=EX-SV;
      *reg1=CSX;
      *reg2=CEX;
    }
  return SV;
}
```

FIG. 12

```
procedure_105(linebuf1,linebuf2,SX,EX,SV,WX)
char *linebuf1;  /* Pointer of linebuffer#1-102a */
char *linebuf2;  /* Pointer of linebuffer#2-105a */
int  SX;         /* Current Start position of document part */
int  EX;         /* Current End position of document part */
int  SV;         /* Horizontal Shift Value */
int  WX;         /* Horizontal Width of Image Memory */
{
    int x;
    char buf1,buf2;
    for(x=0;x<WX;x++) {
       if(x>=SX && x<=EX)
            *(buf2=linebuf2+x-SV)=*(buf1=linebuf1+x);
       else *(buf2=linebuf2+x-SV)=0;
    }
}
```

FIG. 13

```
procedure_106(linebuf2,memory,reg1,reg2)
char *linebuf2;  /* Pointer of linebuffer#2-105a */
int  *memory     /* Pointer of memory-106a */
int  *reg1       /* Pointer of Register#1-103a PSX */
int  *reg2       /* Pointer of Register#2-103b PEX */
{
    int x, *mem;
    for(x=*reg1;x<=*reg2;x++)    *(mem=memory+x)+=1;
}
```

FIG. 14

```
procedure_107(linebuf2,memory,OFFADD,WX)
char *linebuf2;  /* Pointer of linebuffer#2-105a */
int  *memory;    /* Pointer of memory-106a */
char *OFFADD;    /* Offset Address of Image Memory-108 */
int  WX;         /* Horizontal Width of Image Memory */
{
    int x;
    char *ADD,*mem,*buf2;
    for(x=0;x<WX;x++) {
       mem=memory+x;
       ADD=OFFADD+(int)(x+WX*(*mem));
       *ADD=*(buf2=linebuf2+x);
    }
}
```

IMAGE PROCESSING APPARATUS

BACKGROUND OF THE INVENTION

This invention relates to an image processing apparatus that reads the image on a document by raster scanning and which rotates it at the same time.

In image processing, the image on a document is read with an image scanner and subjected to various image processing operations including translation, rotation and deletion. Among those operations, rotation is performed to correct the image if it is read with document inclined. Consider, for example, the case where image information is to be read from a document with an image scanner. If the document set on the image processing apparatus is inclined, data is entered as the image remains inclined. Such image looks unseemly when it is displayed on the screen or printed to deliver a hard copy.

Conventionally, the tilting of input image has been corrected by methods that are applied to the image on an image memory that has been entered and stored in an inclined state. Examples of such methods include: rotating a binary image on the image memory through a predetermined angle and correcting the tilting image on the basis of the dispersive value of the white run length of each column of pixels in the rotated image (see Japanese Patent Unexamined Publication No. Hei. 2-56081); causing the image on an image memory to be displayed on the screen and the user designating a point on the screen to determine the inclination of the image, which is then corrected in position (see Japanese Patent Unexamined Publication No. Hei. 2-130595); and rotating a specified pixel in the image on the image memory by increments of a predetermined angle, determining the angle of image rotation in accordance with the area of each rectangular region defined by the specified pixel, and correcting the inclination of the image (see Japanese Patent Unexamined Publication No. Hei. 2-226372). However, these conventional methods involve various problems. The methods described in the specifications of Japanese Patent Unexamined Publication Nos. Hei. 2-56081 and Hei. 2-226372 require that the image be rotated several times in order to determine the angle of its inclination; as a result, much time is needed to detect the angle of image inclination. The method described in the specification of Japanese Patent Unexamined Publication No. Hei. 2-130595 involves cumbersome procedures for the user such as giving instructions for designating a point on the screen and determining the angle of image inclination. Furthermore, in each of those methods, the tilting image has to be stored (written into the image memory) before the correcting operation is started; since the image is both read from and written into the memory in the step of correction, there has been a limit on the efforts to shorten the processing time.

The aforementioned problems such as the cumbersome procedures and the prolonged processing time are not inherent in the correction of tilting image alone but they are generally associated with the case where the image on a document is read and subjected to rotation.

SUMMARY OF THE INVENTION

The present invention has been accomplished under these circumstances and has as an object providing an image processing apparatus that is capable of performing image rotation at high speed by simple procedures.

This object of the present invention can be attained by an image processing apparatus that includes comparing means for comparing image data in a plurality of scan lines for one scanning direction in an original image including a region to be moved, calculating means for calculating deviation from reference lines of the region to be moved on the basis of a result of comparison by the comparing means, and moving means for moving individual pixels in each scan line on the basis of a result of calculation by the calculating means.

BRIEF DESCRIPTION OF THE DRAWINGS

FIG. 5 is a diagram showing how the unit of detecting the deviation in the fast scanning direction is operated when the image scanner outputs image as shown in FIG. 4;

FIG. 6 is a diagram showing how the unit of detecting and storing the deviation in the slow scanning direction is operated when the image scanner outputs image as shown in FIG. 4;

FIG. 10 is a list showing the program for the software that implements the unit of detecting the deviation in the fast scanning direction;

FIG. 12 is a list showing the program for the software that implements the unit of correcting the deviation in the fast scanning direction;

FIG. 13 is a list showing the program for the software that implements the unit of detecting and storing the deviation in the slow scanning diction; and FIG. 14 is a list showing the program for the software that implements the unit of correcting the deviation in the slow scanning direction.

DETAILED DESCRIPTION OF THE INVENTION

The preferred embodiments of the present invention will be described below specifically with reference to the accompanying drawings.

Figure 1:
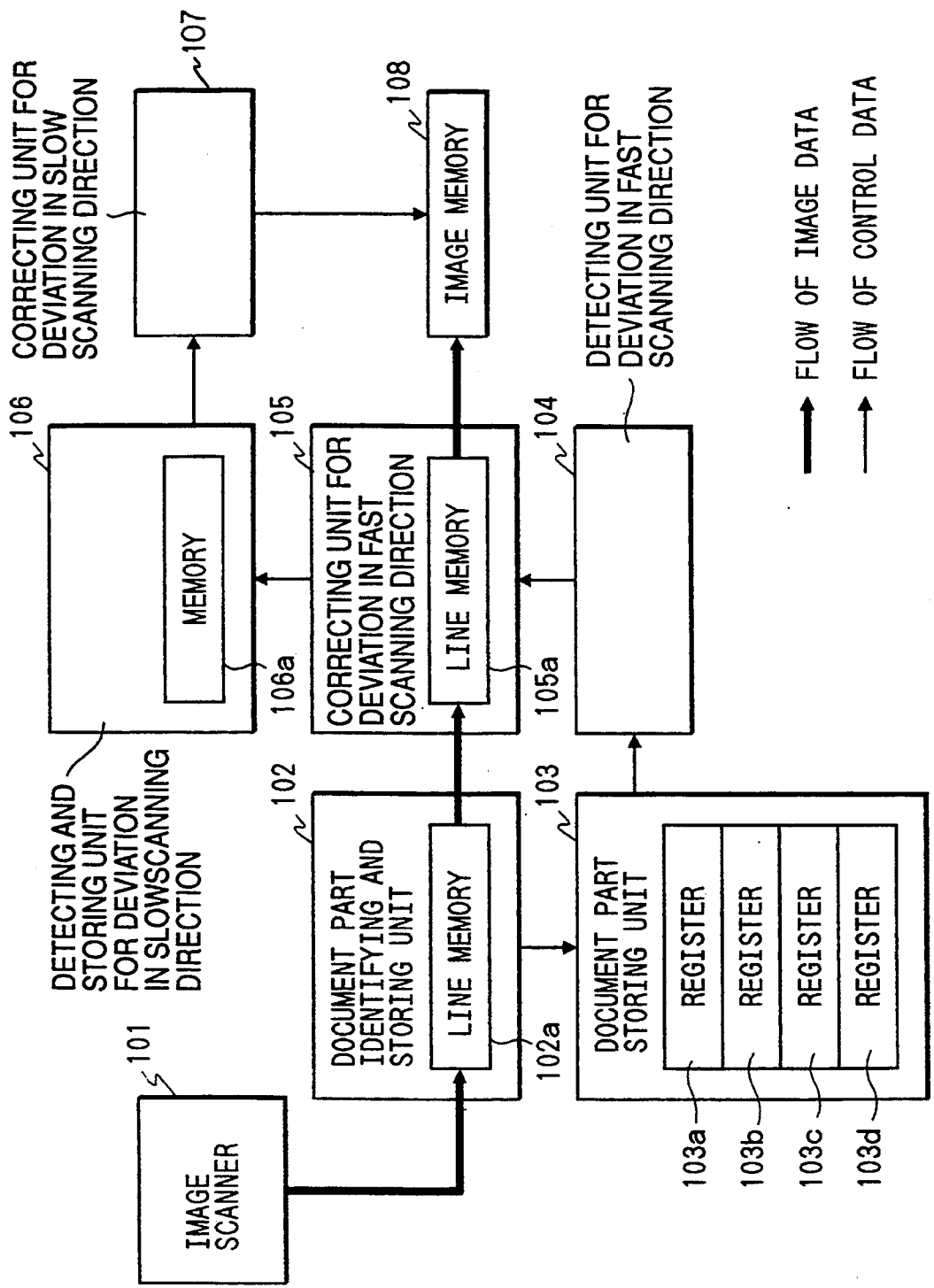
FIG. 1 is a block diagram showing an image processing apparatus according to an embodiment of the present invention.

FIG. 1 is a block diagram showing the composition of an image processing apparatus according to an embodiment of the present invention. As shown, the apparatus includes the following components: an image scanner 101 for reading the document to generate an image; a document part identifying and storing unit 102 which determines, for each line, whether the generated image is associated with the document part or the non-document part and which then stores the identify of the image in a line memory 102a; a document part storing unit 103 by which the range of the image in the document part is stored in terms of the coordinates in the fast scanning direction in such a way that the start and end points are stored in a register 103a and a register 103b, respectively, whereas the document start and end lines are stored in a register 103c and a register 103d, respectively; a unit 104 for detecting the deviation in the fast scanning direction from the reference line on the basis of the stored data on the range of the document part and which calculates not only the direction of correcting the deviation but also the amount by which the image has to be shifted; a unit 105 for correcting the deviation in the fast scanning direction by shifting the image on the basis of the calculated direction of correction and amount of image shift and which stores the corrected deviation in a line memory 105a; a unit 106 for detecting and storing the deviation in the slow scanning direction, by which only the document part of the line memory 105a that has been corrected for the deviation in the fast scanning direction is counted in the slow scanning direction in terms of the coordinates in the fast scanning direction so that the deviation in the slow scanning direction from the reference line is stored in a memory 106a; a unit 107 by which the address at which the image data on the line memory 105a is to be written into an image memory 108 is calculated on the basis of the data stored in the memory 106a, with the image data being subsequently written into the image memory 108 at the calculated address, thereby correcting the deviation in the slow scanning direction; and the image memory 108 in which the image corrected for inclination is generated. In the embodiment under consideration, the reference line for detecting the deviation in the fast scanning direction is perpendicular to that direction, whereas the reference line for detecting the deviation in the slow scanning direction is parallel to the fast scanning direction. It should also be noted that each reference line will pass through the center of rotation when the image on the document is being moved.

Figure 2:
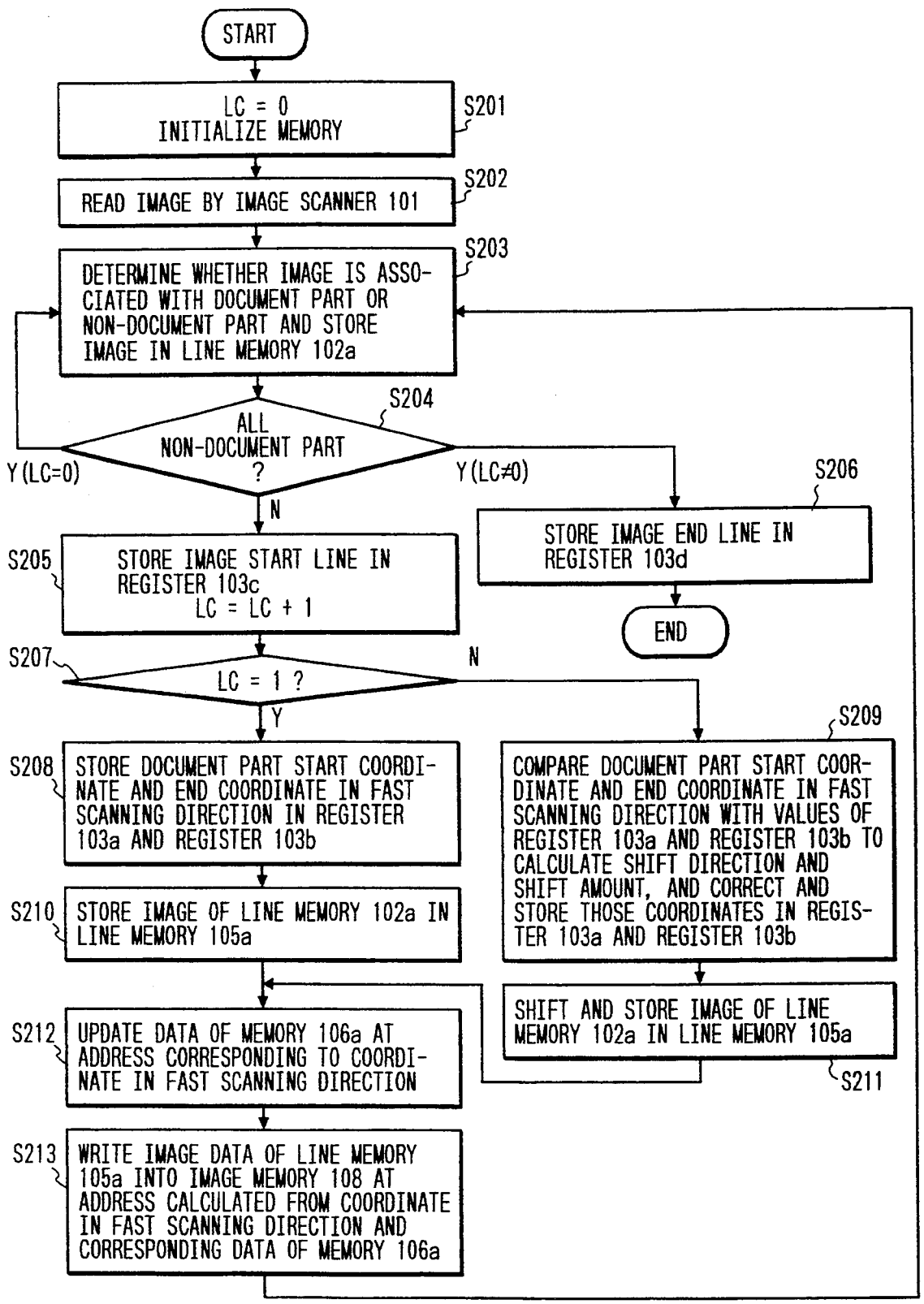
FIG. 2 is a flow chart illustrating the operation of the image processing apparatus shown in FIG. 1.

The operation of the image processing apparatus shown in FIG. 1 will be described below with reference to the flow chart of FIG. 2. The operation starts with step S201, in which the contents of the memory 106a and image memory 108 are cleared so that the line counter parameter LC is adjusted to zero before the image scanner 101 starts to read the image on the document. The line counter parameter LC is the count of the number of lines embracing the document part and may typically be provided by an LC counter (not shown) incorporated in the document part identifying and storing unit 102.

In step S202, the image scanner 101 starts to read the image on the document. The operation of correcting the inclination of image is performed by a pipeline as the reading of document image starts, so that the correcting procedure will not cause the image scanner 101 to stop outputting the image data during its operation.

Figure 3B:
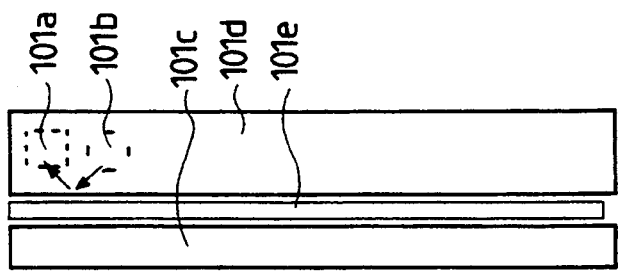
FIGS. 3(a) and 3(b) are front and side views showing an image scanner that may be used with the image processing apparatus shown in FIG. 1.
Figure 3A:
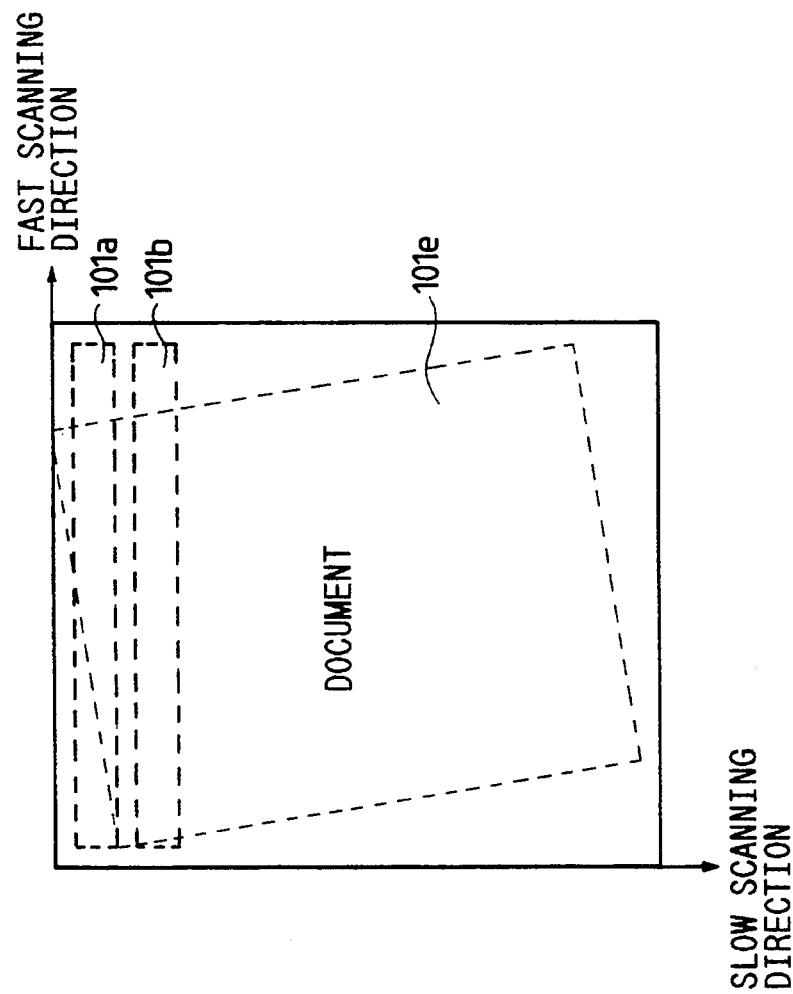

The image scanner 101 is composed as shown in FIG. 3a (front view) and in FIG. 3b (right side view). After placing a document 101e on a platen 101d, platen cover 101c is closed and an image sensor array 101a scans over the document 101e; the light from a light source 101b is reflected by the document 101e and received by image sensor array 101a, which produces a digital output of the intensity of the reflected light. The back side of the platen cover 101c is specular, so that one can determine whether the output of image sensor array 101a is associated with the document part causing completely random reflection or the non-document part causing specular reflection. Stated more specifically, a threshold S is set for the intensity of reflected light and if the output R of image sensor array 101a which indicates the intensity of reflected light is greater than S, the light can safely be regarded as coming from the non-document part and, if R<S, the light can be regarded as coming from the document part.

In step S203, the document part identifying and storing unit 102 determines whether the image output data from the image scanner 101 is associated with the document part or the non-document part (as mentioned in the preceding paragraph, the criterion for determination is the threshold S for the intensity of reflected light). If the data is associated with the non-document part, "0" is written in the line memory 102a whereas, if the data is associated with the document part, density $D=F(\log(R+1))+1$ is written in the memory. In $D=F(\log(R+1))+1$, log signifies logarithm and $F(\ldots)$ denotes a function that is determined by the system to be connected to the image processing apparatus under consideration, as well as by the quantization level.

In step S204, question is asked whether all the image data for one line is associated with the non-document part. If the answer is affirmative and if the line count parameter LC is zero, the process reverts to step S203 and does not start until image scanner 101 outputs image data for the next line. If the line count parameter LC is not zero, the process goes to step S206. If at least part of the image data for one line is associated with the document part, the process goes to step S205.

In step S205, the document part storing unit 103 stores in the register 103c the line at which the document part starts and it then increases the line count parameter LC by an increment of "1".

In step S206, the document part storing unit 103 stores in the register 103d the line at which the document part ends.

In step S207, check is made as to whether the line of interest is for the start of the image in the document part and if the answer is affirmative, the process goes to step S208 and, if not, the process goes to step S209.

In step S208, the coordinate SX in the fast scanning direction for the point where the document part for the current scan line (i.e., the image in the line memory 102a) starts and the coordinate EX in the fast scanning direction for the end point of the document part are stored in the register 103a and register 103b, respectively, in the document part storing unit 103. The data in these registers will later be referenced as PSX (the coordinate in the fast scanning direction of the document part start point for the previous line) and PEX (the coordinate in the fast scanning direction of the document part end point for the previous line), respectively.

In step S209, the unit 104 of detecting the deviation in the fast scanning direction compares SX and EX with the PSX and PEX stored in the registers 103a and 103b and calculates CSX and CEX by correcting SX and EX, respectively, using the following equation (1):

$$CSX=SX-SV, CEX=EX-SV \quad (1)$$

where SV is whichever of (SX−PSX) and (EX−PEX) that is the smaller in absolute value. The deviation detecting unit 104 stores CSX in the register 103a and CEX in the register 103b.

The CSX stored in register 103a and the CEX stored in the register 103b will be referenced as PSX and PEX, respectively, when the next line is processed.

In step S210, the unit 105 of correcting the deviation in the fast scanning direction transfers the image in the line memory 102a to the line memory 105a without shifting it.

Figure 4:
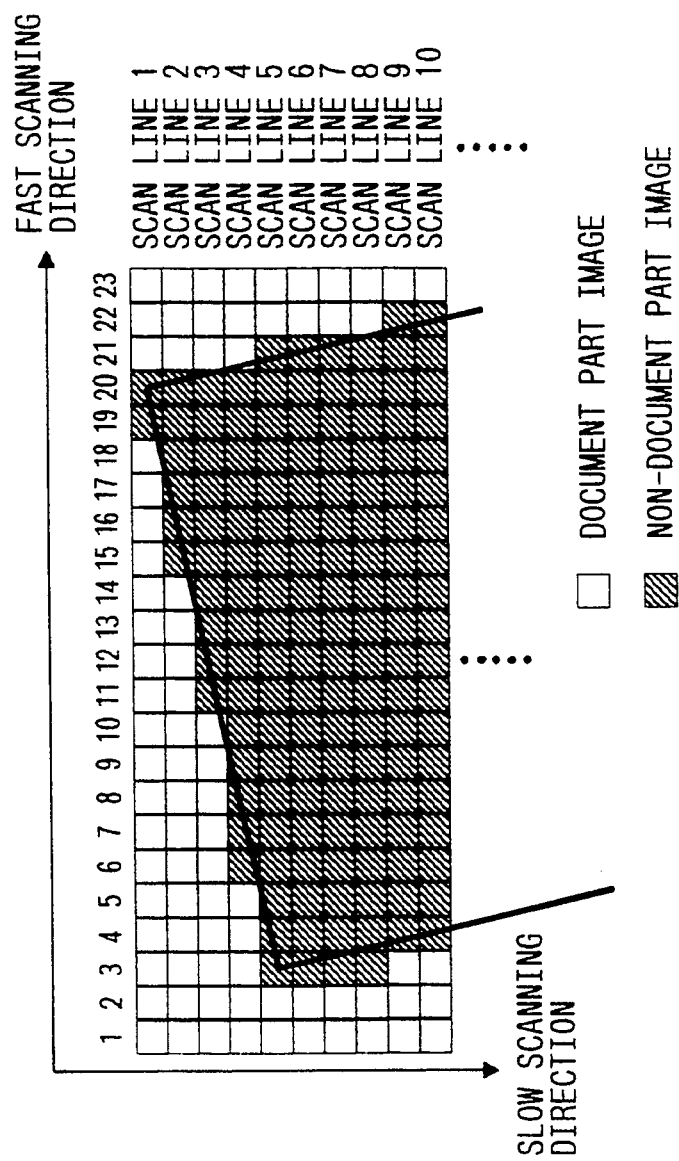
FIG. 4 is a diagram showing how the output image from the image scanner looks like when the document is set in an inclined state.

In step S211, the deviation correcting unit 105 transfers the image in the line memory 102a to the line memory 105a after shifting it on the basis of the deviation SV which has been determined in step S209. If SV has a positive sign, the image will be shifted by the absolute value of SV in a direction in which the coordinate in the fast scanning direction decrements; if SV has a negative sign, the image will be shifted by the same amount in a direction in which the coordinate increments. FIG. 4 shows the case where the image on an inclined document has been read by the image scanner 101 and FIG. 5 shows the resulting deviation SV for each scan line.

In step S212, the unit 106 of detecting and storing the deviation in the slow scanning direction reads the data in the memory 106a at an address corresponding to the coordinate in the fast scanning direction of that image data in the line memory 105a which is associated with the document part; the unit 106 then increases the data by an increment of "1" and stores it. FIG. 6 shows the data stored in the memory 106a for each scan line when the image on the document inclined as shown in FIG. 4 has been read by the image scanner 101.

In step S213, the unit 107 of correcting the deviation in the slow scanning direction writes the image data on the line memory 105a into the image memory 108 at the calculated address ADD and generates an image with the inclination corrected properly. The address ADD on the image memory 108 can be calculated by the following equation (2):

$$ADD=OFFADD+X+M(X)\cdot WX \quad (2)$$

where OFFADD is an offset address for developing image over the image memory 108, X is the coordinate in the fast scanning direction of the image in the document part stored in the line memory 105a, M(X) is the data in the memory 106a at the address corresponding to the coordinate X in the fast scanning direction, and WX is the image size in the fast scanning direction which is set by the image memory 108.

The procedure described above is repeated each time the image scanner 101 outputs image for the next line; when the image end line is reached, the process goes to step S206 for completing the correction of image inclination.

Specific circuit examples for the image processing apparatus under consideration will be described below with reference to FIGS. 7 to 9.

Figure 7:
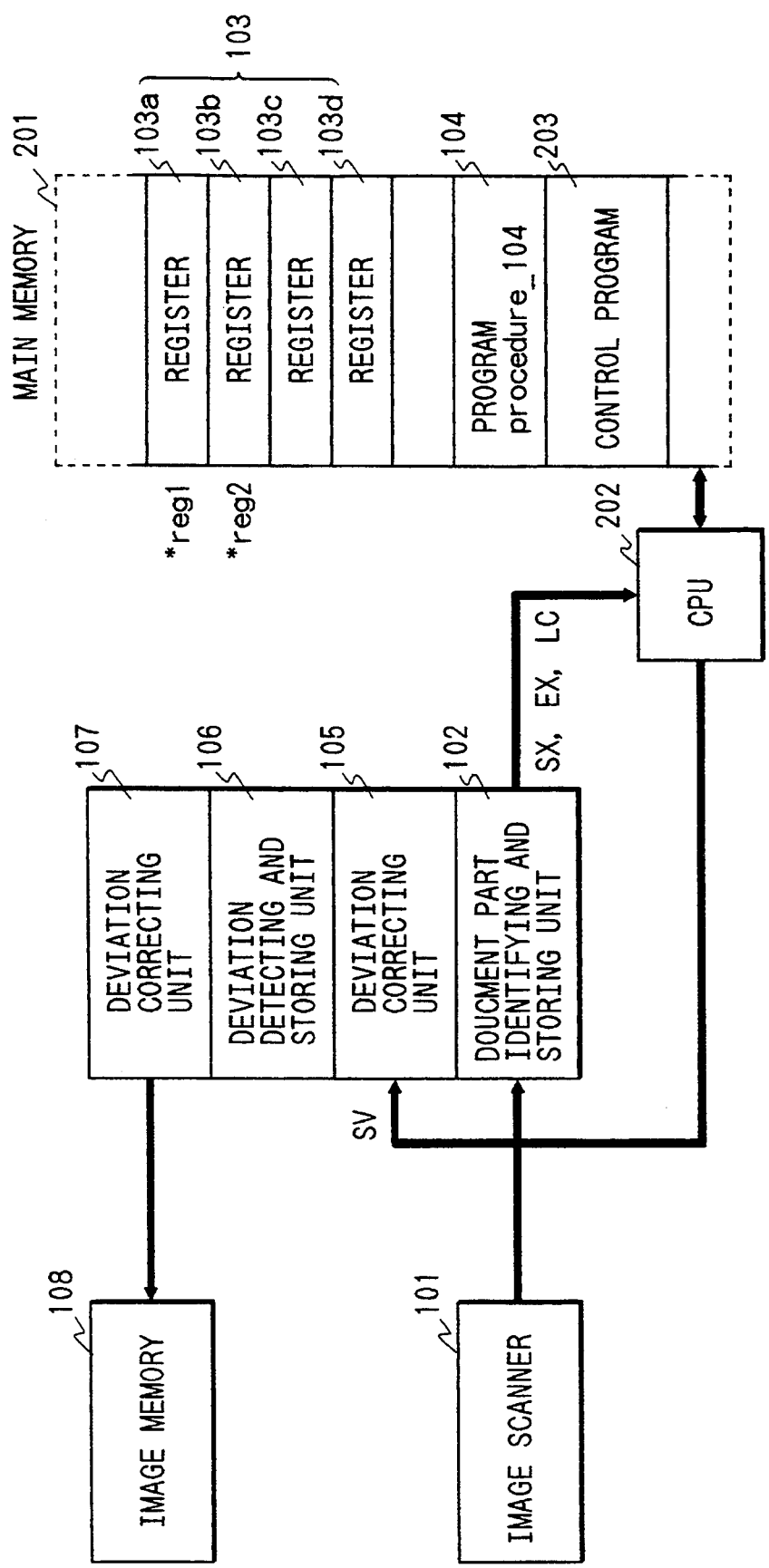
FIG. 7 is a block diagram showing an image processing apparatus according to another embodiment of the present invention in which the unit of detecting the deviation in the fast scanning direction is implemented by software.

FIG. 7 shows the overall composition of the image processing apparatus and the components and units which correspond to those shown in the block diagram FIG. 1 are identified by like numerals. In the case shown in FIG. 7, the document part identifying and storing unit 102, the unit 105 of correcting the deviation in the fast scanning direction, the unit 106 of detecting and storing the deviation in the slow scanning diction and the unit 107 of correcting the deviation in the slow scanning direction are composed by hardware as shown in FIGS. 8 and 9. The apparatus includes a main memory 201 which not only insures regions that correspond to registers 103a to 103d in the document part storing unit 103 but also stores "procedure_104", a program for implementing the deviation detecting unit 104 by software. The apparatus further includes a CPU (central processing unit) 202 which performs image rotation on the basis of a control program 203 stored in the main memory 201.

Figure 8:
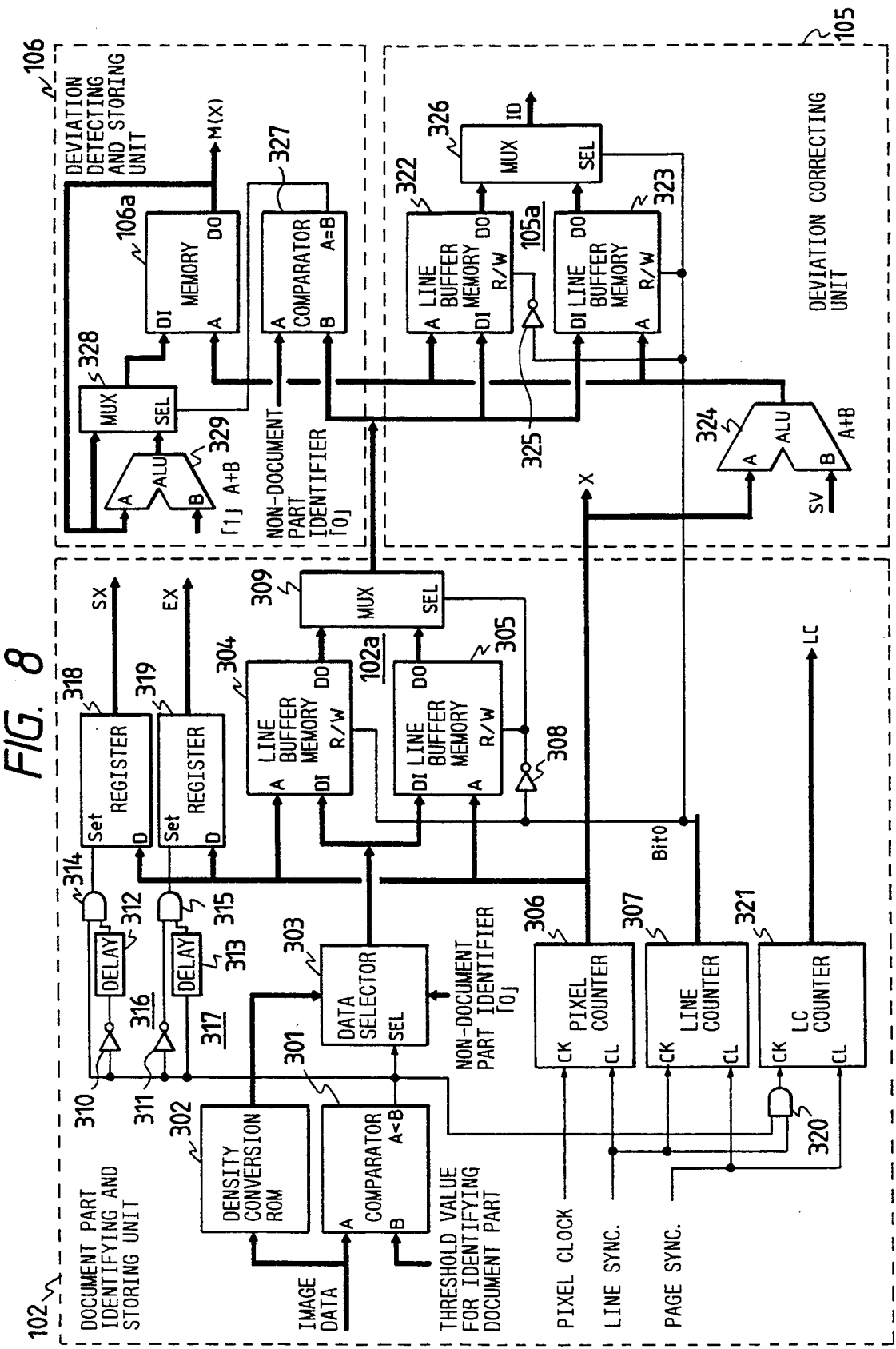
FIG. 8 is a block diagram showing details of three components of the image processing apparatus shown in FIG. 7, i.e., the unit of identifying the document part and storing its identity, the unit of correcting the deviation in the fast scanning direction, and the unit of detecting and storing the deviation in the slow scanning direction.
Figure 9:
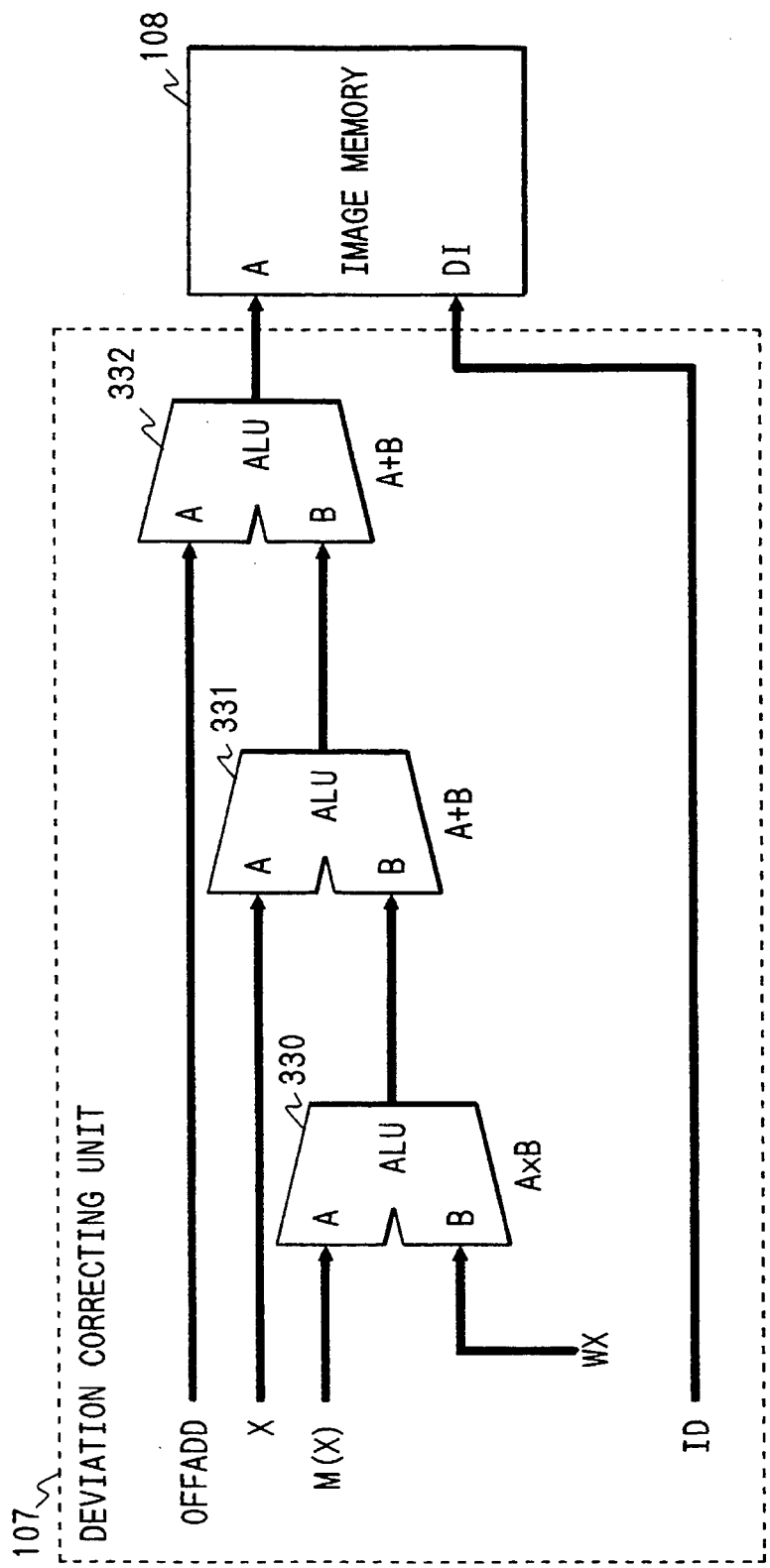
FIG. 9 is a block diagram showing details of the unit of correcting the deviation in the slow scanning direction which is incorporated in the image processing apparatus shown in FIG. 7.

The circuits shown in FIGS. 7 to 9 are operated in the manner described below.

First, image data from the image scanner 101 is supplied to the document part identifying and storing unit 102, in which a comparator 301 (see FIG. 8) compares the supplied image data with the threshold for identifying the document part, or the aforementioned S (the threshold for the intensity of reflected light). If the value of the image data is lower than the threshold, the comparator outputs "1". The image data is also supplied to a density conversion ROM (read-only memory) 302, which performs density conversion for $D=F(\log(R+1))+1$. The thus processed image data is supplied to one input of a data selector 303. In the equation set forth above, R signifies the output from image sensor array 101a representing the intensity of reflected light, and D denotes the density after density conversion. The other input of data selector 303 is supplied with a non-document part identifier "0". The data selector 303 selects the output from the density conversion ROM 302 when "1" is supplied to the SELECT terminal and selects the non-document part identifier "0" when "0" supplied to that SELECT terminal. In the non-document part, R is greater than S but in the document part, R is smaller than S; hence, the data selector 303 selects "0" for the non-document part but it selects density D for the document part.

The output form the data selector 303 is supplied to the DATA INPUT terminals of a pair of line buffer memories 304 and 305 which compose the line memory 102a. The ADDRESS terminals of the line buffer memories 304 and 305 are supplied with the output of a pixel counter 306 that is driven with a pixel clock signal and which is cleared in response to a line sync signal. A "bit 0" signal as an output from a line counter 307 that is driven with a line sync signal and which is cleared in response to a page sync signal is supplied directly to the READ/WRITE terminal of the line buffer memory 304 but supplied indirectly to the READ/WRITE terminal of the line buffer memory 305 via an inverter 308. Hence, data is written into and read from the line buffer memories 304 and 305 alternately for each line and their outputs are selected alternatively by means of a multiplexer 309 for delivery to subsequent circuits.

The output of the comparator 301 is also supplied to a rise detector circuit 316 and a fall detector circuit 317.

The circuit 316 is composed of an inverter 310, a delay circuit 312 and an AND circuit 314, whereas the circuit 317 is composed of an inverter 311, a delay circuit 313 and an AND circuit 315. The output of the rise detector circuit 316 is supplied to the SET terminal of a start point register 318, whereas the output of the fall detector circuit 317 is supplied to the SET terminal of an end point register 319. The DATA terminals of the registers 318 and 319 are supplied with the output of the pixel counter 306 and, hence, those registers store temporarily SX (the coordinate of the document part start point in the fast scanning direction) and EX (the coordinate of the document part end point in the fast scanning diction).

The output of the comparator 301 as well as a line sync signal are supplied to an LC counter 321 via an AND circuit 320 and the LC counter 321 is cleared in response to a page sync signal. Hence, the value of line count parameter LC increases for each line in the region where the document is present.

The values of SX, EX and LC are read by CPU 202 as shown in FIG. 7 and SV, or the deviation in the fast scanning direction, is determined by the relevant detection program shown in FIG. 10. The program is intended to deliver software for performing an operation with the deviation detecting unit 104 using the CPU 202 and, in the case under consideration, the program is written in C language. This program named "procedure_104" is stored in a region within the main memory 201.

Figure 11:
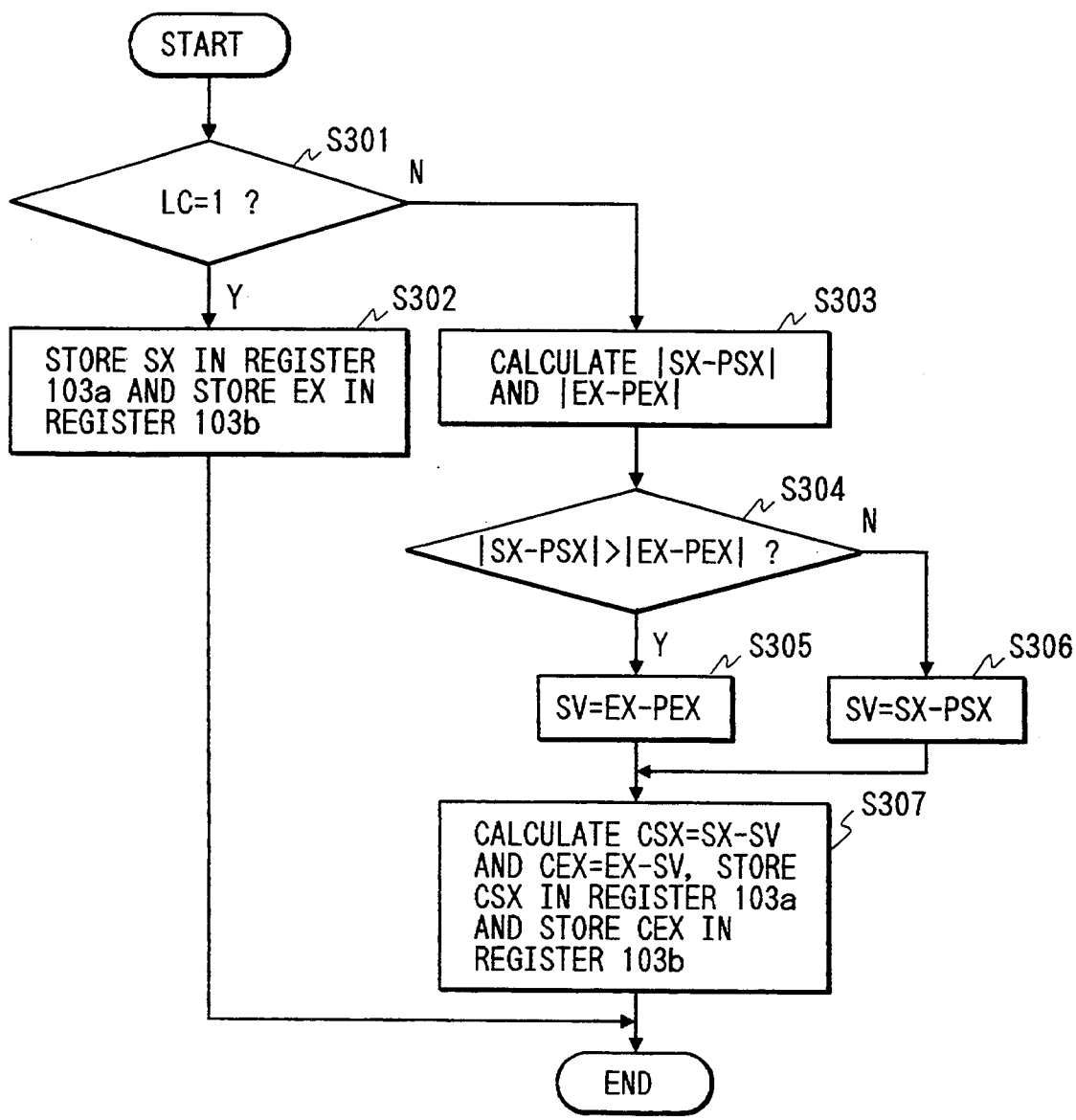
FIG. 11 is a flow chart for illustrating the execution of the program shown in FIG. 10.

FIG. 11 is a flow chart showing the sequence of steps in the program shown in FIG. 10 for detecting the deviation in the fast scanning direction. Firstly, question is asked whether the value of line count parameter LC is "1" or not (step S301). If LC=1, the value of SX is stored in the register 103a and the value of EX is stored in the register 103b (step S302). If LC≠1, the absolute values of (SX−PSX) and (EX−PEX) are calculated on the basis of both PSX stored in the register 103a and PEX stored in the register 103b (step S303). Then, question is asked whether |SX−PSX| > |EX−PEX| (step S304) and if the answer is affirmative, EX−PEX is output as SV (step S305); if the answer is negative, SX−PSX is output as SV (step S306). Subsequently, CSX (=SX−SV) and CEX (=EX−SV) are calculated and the former is stored in the register 103a whereas the latter is stored in the register 103b (step S307).

The output of multiplexer 309 in the document part identifying and storing unit 102 shown in FIG. 8 is supplied to the DATA INPUT terminals of a pair of line buffer memories 322 and 323 provided in the unit 105 of correcting the deviation in the fast scanning direction. The ADDRESS terminals of the line buffer memories 322 and 323 are each supplied with the data from an arithmetic-logic unit (ALU) 324 which is the sum of the output X of the pixel counter 306 and the deviation SV determined by the program "procedure_104". A "bit 0" signal as the output of the line counter 307 is supplied indirectly to the READ/WRITE terminal of the line buffer memory 322 via an inverter 325 and directly to the READ/WRITE terminal of the line buffer memory 323. Hence, data is written into and read from the line buffer memories 322 and 323 alternately for each line as in the case of line buffer memories 304 and 305, except that the operating phase is reversed. The outputs of line buffer memories 322 and 323 are selected alternately by means of a multiplexer 326, which outputs image data ID that has been properly corrected for any deviation in the fast scanning direction.

The output of multiplexer 309 is also supplied to a comparator 327 provided in the unit 106 of detecting and storing the deviation in the slow scanning direction. The supplied output is compared with the non-document part identifier "0" and, if it is associated with the non-document part, the output from the comparator 327 will assume the value "1". The output of the comparator 327 is supplied to a multiplexer 328 as a selection signal. The multiplexer 328 selectively delivers the output of memory 106a or the output of an arithmetic-logic unit 329; the former output is produced if the selection signal is "1" and the latter output is produced if the selection signal is "0". The output of the memory 106a and the data for constant "1" are both supplied to the arithmetic-logic unit 329, which outputs a value that is greater than the output of the memory 106a by an increment of "1". Hence, M(X), or the value of the portion of the memory 106a addressed by the output of the arithmetic-logic unit 324, will increase by "1" for each line only in association with the document part.

As shown in FIG. 9, M(X) produced from the unit 106 of detecting and storing the deviation in the slow scanning direction is supplied, together with WX (data indicating the width of the image on the image memory), to an arithmetic-logic unit 330 provided in the unit 107 of correcting the deviation in the slow scanning direction, in which the two inputs are multiplied. The output of multiplication is supplied to an arithmetic-logic unit 331, where it is added to the output X of the pixel counter 306. The sum output is sent to an arithmetic-logic unit 332, where it is further added to the offset address OFFADD. The sum output obtained is supplied to the ADDRESS terminal of the image memory 108. The image memory 108 is also supplied at the DATA INPUT terminal with the image data ID produced from the unit 105 of correcting the deviation in the fast scanning direction. Hence, image that has been properly corrected in both the fast and slow scanning directions will be written into the image memory 108 on a real time basis in synchronism with the scanning of the document by means of the image scanner 101.

In the embodiment shown in FIGS. 7 to 9, unit 105 of correcting the deviation in the fast scanning direction, unit 106 of detecting and storing the deviation in the slow scanning direction and unit 107 of correcting the deviation in the slow scanning diction are all composed by hardware but it should be noted that these portions can also be implemented by software.

FIGS. 12, 13 and 14 show "procedure_105", "procedure_106" and "procedure_107", which are programs for delivering software that will implement the units 105, 106 and 107, respectively. As in the case of "procedure_104", these programs are stored in the main memory 201 and executed by the CPU 202. Each of the programs is written in C language and details of them need not be described here since it will be easy for one skilled in the art to understand their operations by just looking at them.

As described on the foregoing pages, the image processing apparatus of the present invention detects image deviations in the fast and slow scanning directions as it scans the image on the document and, with the image data and address being manipulated on the basis of the detected deviations, the apparatus writes the image directly into the associated image memory. This obviates the heretofore required cumbersome procedure of performing image rotation several times after writing the image into the image memory and, hence, the image can be rotated through a desired angle within a short time.

What is claimed is:

1. An image processing apparatus comprising:
   identifying means for identifying image data as being associated with an image in a non-document part or an image in a document part for each scan line in a first scanning direction of the image data;
   comparing means for comparing ranges of image in the document part for a plurality of scan lines that have been identified by said identifying means;
   horizontal direction calculating means for calculating deviation from a reference line of the range of image in the document part in the first scanning direction on the basis of a result of comparison by said comparing means;
   horizontally moving means for moving the image in the first scanning direction in accordance with the deviation detected by said horizontal direction calculating means, whereby the deviation in the first scanning direction is corrected to generate a first set of corrected image data;
   vertical direction calculating means for calculating an amount of movement in a second direction perpendicular to the first scanning direction on the basis of the number of pixels in the document part occupied by the image as corrected by said horizontally moving means in the second direction; and
   vertically moving means for moving the image data for each pixel in the second direction on the basis of a result of calculation by said vertical direction calculating means to generate a second set of corrected image data.

2. The image processing apparatus according to claim 1, wherein said identifying means distinguishes between the images in the document and non-document parts by comparing a density of image data of each pixel with a threshold value.

3. The image processing apparatus according to claim 1, further comprising image reading means for scanning the image to convert it into image data.

4. The image processing apparatus according to claim 1, further comprising storage means for storing image data.

5. The image processing apparatus according to claim 1, further comprising scan line storage means for storing the first set of corrected image data as generated by said horizontally moving means.

6. The image processing apparatus according to claim 1, further comprising corrected image data storage means for storing the second set of corrected image data as generated by said vertically moving means.

7. The image processing apparatus according to claim 1, wherein said vertical direction calculating means includes horizontal pixel number storage means for storing the number of pixels in the document part occupied by the image as corrected by said horizontally moving means in the second direction.

* * * * *